US008851569B2

(12) United States Patent
Ho

(10) Patent No.: US 8,851,569 B2
(45) Date of Patent: Oct. 7, 2014

(54) FULL-COVER AND LIGHT-WEIGHT SAFETY SEAT FOR CHILD

(76) Inventor: Chang-Hsien Ho, Taoyuan County (TW)

(*) Notice: Subject to any disclaimer, the term of this patent is extended or adjusted under 35 U.S.C. 154(b) by 453 days.

(21) Appl. No.: 13/241,495

(22) Filed: Sep. 23, 2011

(65) Prior Publication Data

US 2013/0076084 A1    Mar. 28, 2013

(51) Int. Cl.
*A47C 1/08* (2006.01)
*B60N 2/28* (2006.01)
*A47D 13/02* (2006.01)
*B60N 2/68* (2006.01)

(52) U.S. Cl.
CPC ............ *A47D 13/025* (2013.01); *B60N 2/2863* (2013.01); *B60N 2/2884* (2013.01); *B60N 2/2854* (2013.01); *B60N 2/686* (2013.01)
USPC .............. 297/250.1; 297/452.14; 297/452.17; 297/452.25; 297/452.26; 297/452.61

(58) Field of Classification Search
USPC ............... 297/250.1, 452.12, 452.14, 452.17, 297/452.25, 452.26, 452.61
See application file for complete search history.

(56) References Cited

U.S. PATENT DOCUMENTS

| | | | | |
|---|---|---|---|---|
| 3,043,627 A * | 7/1962 | Torjusen | .................. | 297/452.14 |
| 3,596,986 A * | 8/1971 | Ragsdale | .................... | 297/183.6 |
| 3,713,697 A * | 1/1973 | Koepke | .................... | 297/452.61 |
| 3,992,056 A * | 11/1976 | Koziatek et al. | ......... | 297/256.13 |
| 4,077,665 A * | 3/1978 | Storch | ........................... | 297/244 |
| 4,564,240 A * | 1/1986 | Thieme | .................... | 297/452.14 |
| 4,577,907 A * | 3/1986 | Talmon et al. | ............ | 297/452.12 |
| 4,634,177 A * | 1/1987 | Meeker | .................... | 297/256.13 |
| 5,286,086 A * | 2/1994 | Gunji | .......................... | 297/250.1 |
| 5,460,873 A * | 10/1995 | Ogawa et al. | ............... | 428/316.6 |
| 5,700,050 A * | 12/1997 | Gonas | ...................... | 296/187.05 |
| 5,865,710 A * | 2/1999 | Wilson-Hyde | .................. | 482/52 |
| 5,887,950 A * | 3/1999 | Kuo | ......................... | 297/440.13 |
| 6,000,753 A * | 12/1999 | Cone, II | .................... | 297/256.16 |
| 6,371,562 B1 * | 4/2002 | Yoshimura et al. | ....... | 297/452.61 |
| 6,565,152 B2 * | 5/2003 | Craft et al. | ..................... | 297/248 |
| 7,270,372 B2 * | 9/2007 | Robertson | .................. | 297/183.6 |
| 7,850,246 B2 * | 12/2010 | Kolich et al. | ............ | 297/452.15 |
| 8,276,985 B2 * | 10/2012 | Kho et al. | ...................... | 297/130 |
| 8,602,501 B2 * | 12/2013 | Walker et al. | ............. | 297/452.15 |
| 2002/0190440 A1 * | 12/2002 | Wilson | .......................... | 264/553 |
| 2006/0103228 A1 * | 5/2006 | Gupta et al. | ............. | 297/452.65 |
| 2008/0190924 A1 * | 8/2008 | Bobrov et al. | ............. | 220/62.22 |
| 2009/0146483 A1 * | 6/2009 | Niwa et al. | ................ | 297/452.61 |
| 2012/0104110 A1 * | 5/2012 | Roberts, Jr. | ..................... | 238/84 |

FOREIGN PATENT DOCUMENTS

JP           06154057 A *    6/1994    ............... A47C 7/00

* cited by examiner

*Primary Examiner* — Laurie Cranmer
(74) *Attorney, Agent, or Firm* — Rosenberg, Klein & Lee

(57) ABSTRACT

A full-cover and light-weight child safety seat is disclosed, capable of improving the difficulties in manufacturing and assembling processes in conventional skills. The safety seat includes a first hard layer, a second hard layer, a body (or a cushion portion) formed by foaming expansion material and a wall formed on a peripheral zones of the body. The body is defined with an inner end surface coated with the first hard layer and an outer end surface covered by the second hard layer so that the foaming expansion material (or the body), the first hard layer and the second hard layer are snuggly and firmly formed in a composite state, thereby improving the improper conditions in conventional skills, such as carry or deliver inconvenience caused by larger thickness/volume and heavier weight for the purpose of obtaining sufficient strength.

30 Claims, 7 Drawing Sheets

FULL-COVER AND LIGHT-WEIGHT SAFETY SEAT FOR CHILD

BACKGROUND OF THE INVENTION

1. Field of the Invention

The present invention relates to a full-cover or integrally-foamed child safety seat, and in particular relates to a configuration design by utilizing a technical means to dispose plastic housings or hard layers on an inner/outer end surfaces of a foaming cushion material so as to obtain an integral composite formation of the foaming cushion material and the plastic housings or hard layers.

2. Description of the Related Art

In conventional child safety seats, foamed plastics (e.g., polystyrene and urethane) or foaming materials are often utilized to combine with several components such as soft cushions and hard chassis to form the structure of the child safety seat, so that a person (e.g., a baby or child) loaded on the safety seat can be well protected from any dangers and impacts. The related skills can be referred to the typical cases such as "Juvenile Seating With Resilient Side Impact Protection" of U.S. Pat. No. 7,726,734 B2, "Seat For Child-care Implement" of U.S. Pat. No. 5,615,927, "Child's Automotive Safety Booster Seat With A View" of U.S. Pat. No. 5,385,385.

One issue related to these child safety seats is that, for the purpose of achieving sufficient structural strength and absorptive or buffering effect, the child safety seat constituted by the foaming cushion (or expansion) material has a larger thickness so that the manufacturing process is relatively more complicated. For example, U.S. Pat. No. 5,615,927 discloses the skill related to three layers of foaming materials, and U.S. Pat. No. 5,385,385 discloses a safety booster seat including a seat portion formed with very large thickness.

To improve the improper conditions in the above-described related skills, assembles of foaming cushion materials or measures of coated with a hard chassis (or plastic housing) have been provided. However, the exposed foaming cushion materials on the outer surfaces of the structure are tended to be damaged in service period.

To reduce the possible damages on the exposed foaming cushion materials above, some soft cushion components are disposed on the outside of the foaming cushion materials for protection. However, those who are skilled in these arts do know that, when the soft cushion components is applied on the outer surface of the foaming cushion materials, the manufacturing cost is relatively increased and the assembling process is more complicated, the weight of the safety seat is relatively increased to cause carry inconvenience and burden to the user, thus affecting the practicability of the safety seat and incapable of qualifying the requirements.

Representative speaking, although the reference data above disclose the skills and the structural designs of the child safety seats, there still have designing and manufacturing difficulties required to be overcome. When redesigning a configuration structure of a child safety seat for obtaining a firm and light structure to be different from the prior skills, the following considerations shall be noted.

First of all, on the prerequisite condition of sufficient impact resistant strength (or buffering function), a total thickness of the safety seat or the body constituted by the foaming cushion (or expansion) material shall be possibly reduced, so that the safety seat can have a weight and volume suitable for being carried.

Further, on the prerequisite condition of comfortability, the assembling process of the soft cushion and the related components thereof, and the safety seat shall be possibly simplified so that the manufacturing and assembling costs of the safety seat can be reduced. Particularly, when dealing large amount of workpieces of the safety seats, the factors deferring the manufacturing efficiency and quality of the safety seat can be eliminated.

Moreover, on the prerequisite condition that the safety seat or the body constituted by the foaming expansion material can be perfectly protected, particularly to the service period, damages or impairs to the safety seat or the body shall be possibly reduced, so that the factors affecting the absorption or buffering function of the foaming expansion material can be minimized.

Therefore, for solving the difficulties in conventional skills and attaining the above-described considerations, it is essential to develop a technical means to provide an integrally-formed safety seat with a configuration structure capable of fully covering foaming cushion materials. However, these topics are not taught or mentioned in the disclosures of the reference patent cases above.

BRIEF SUMMARY OF THE INVENTION

In view of this, the main purpose of the present invention is to provide a full-cover and light-weight child safety seat, capable of improving controllability in the manufacturing process, simplifying the assembling complication, and decreasing the weight of the safety seat in conventional skills. The safety seat includes a first hard layer, a second hard layer, a body (or a cushion portion) formed by foaming expansion material and a wall formed on a peripheral zones of the body. The body is defined with an inner end surface coated with the first hard layer and an outer end surface covered by the second hard layer so that the foaming expansion material (or the body), the first hard layer and the second hard layer are snuggly and firmly formed in a composite state, thereby improving the improper conditions in conventional skills, such as carry or deliver inconvenience caused by larger thickness/volume and heavier weight for the purpose of obtaining sufficient strength.

According to the full-cover and light-weight child safety seat of the present invention, the first hard layer and/or the body and/or the second hard layer are/is disposed with a guide slot, thereby increasing the compressive resistant strength or intensity of load of the safety seat or the body. With the first hard layer and/or the body and/or the second hard layer disposed with the guide slot, a path of the guide slot is disposed with gas holes to assist in increasing the gas permeability of the baby or child loaded on the safety seat.

Actually, the guide slot and the gas holes establish a path and mechanism for guiding or expelling the airflow. That is, when the body, the first hard layer and second hard layer allocated in a module are heated to perform an integrally-formed process, the foaming expansion (or cushion) material forces the air in the module to move along the guide slot and to be expelled out of the module via the gas holes.

According to the full-cover and light-weight child safety seat of the present invention, the wall formed on the peripheral zones of the body has a height at least equal to one-third of a width of the body, thereby utilizing the walls to assist in enclosing the person loaded on the body.

According to the full-cover and light-weight child safety seat of the present invention, the first hard layer is defined with an upper surface and a lower surface, wherein the lower surface of the first hard layer is formed with at least one rib portion assembled with an anchor portion. When the body and the first hard layer allocated in the module are heated to perform the integrally-formed process, the anchor portion is utilized to auxiliary anchor the foaming cushion material (or the body), so that a more stable combination status of between the body and the first hard layer is obtained, and also the structural strength of the combination structure of the body and the first hard layer is enhanced.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
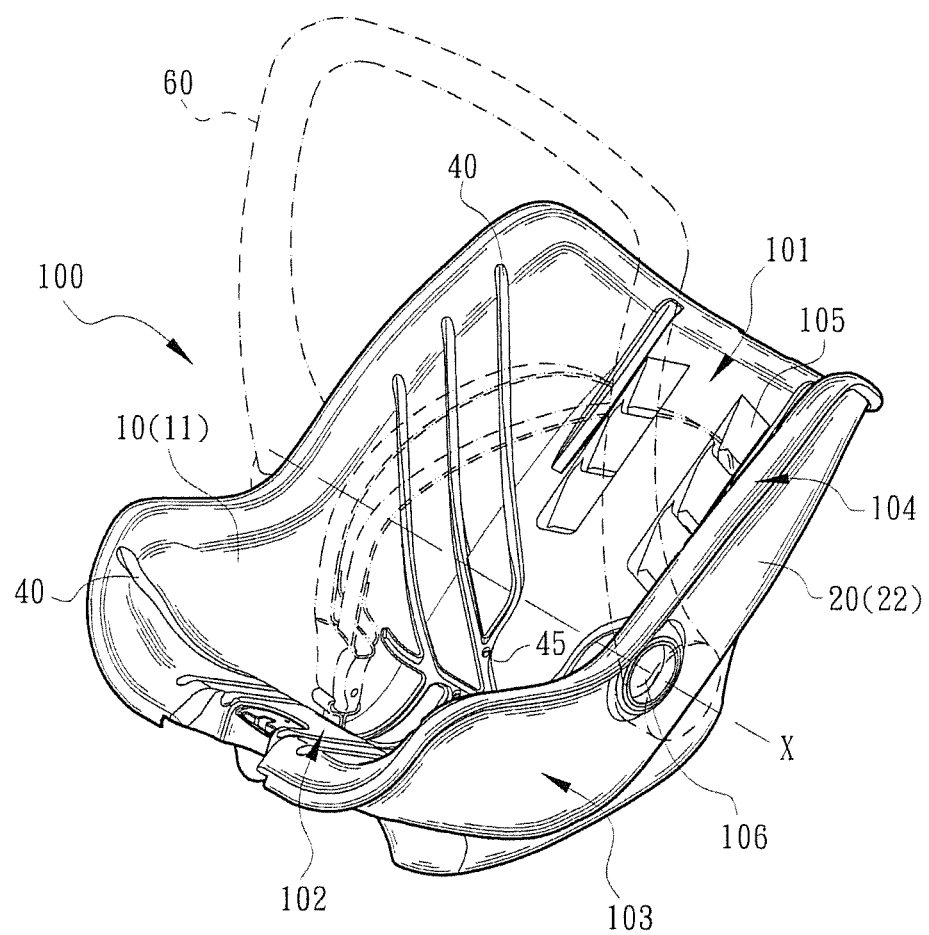
FIG. 1 is an outside schematic view of a safety seat of the present invention, wherein an imaginary line represents a situation of the safety seat assembled with a handle.
Figure 2:
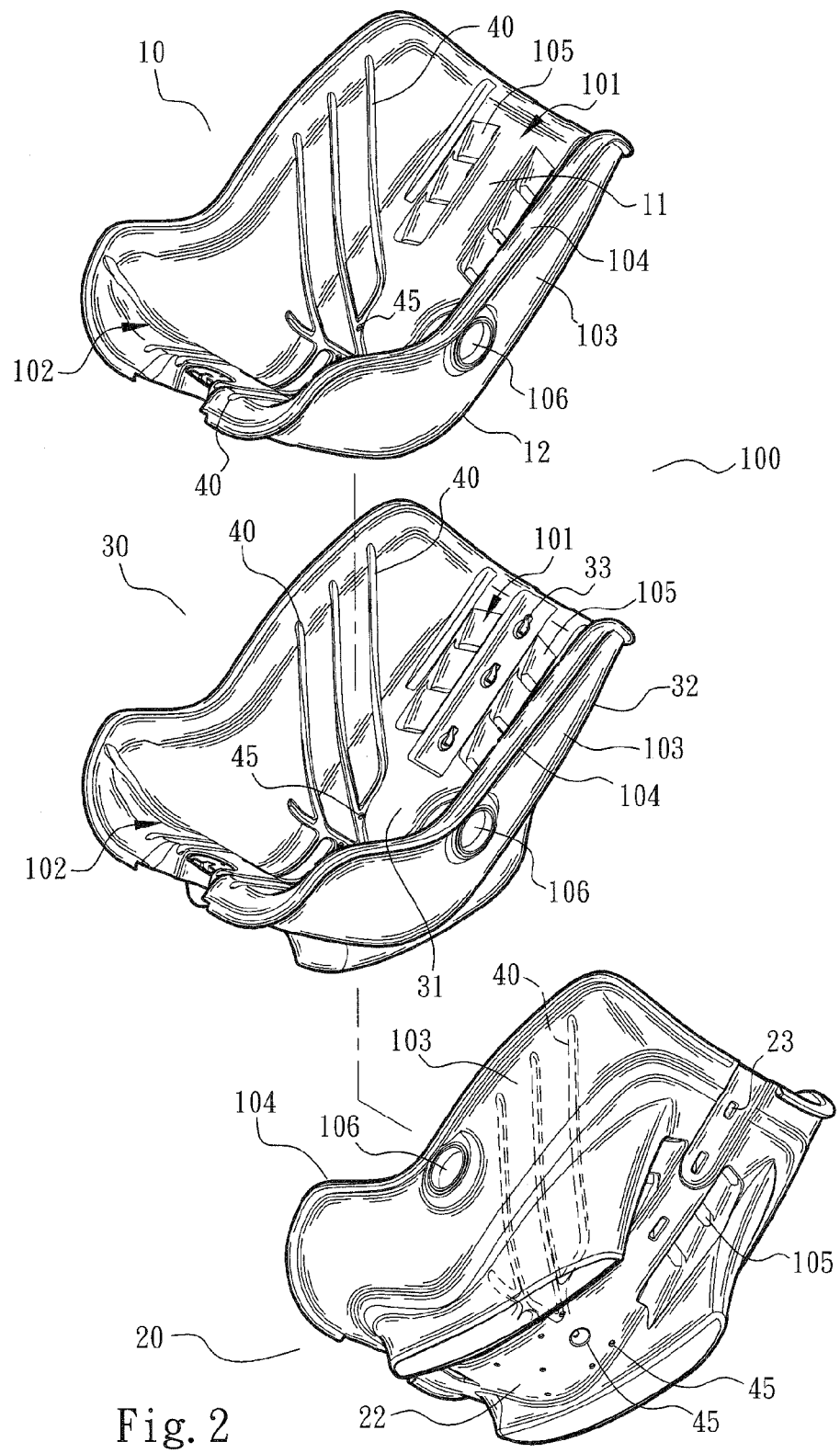
FIG. 2 is a schematic exploded view of the structure of the present invention, showing a situation of a first hard layer, a second hard layer and a body.
Figure 3:
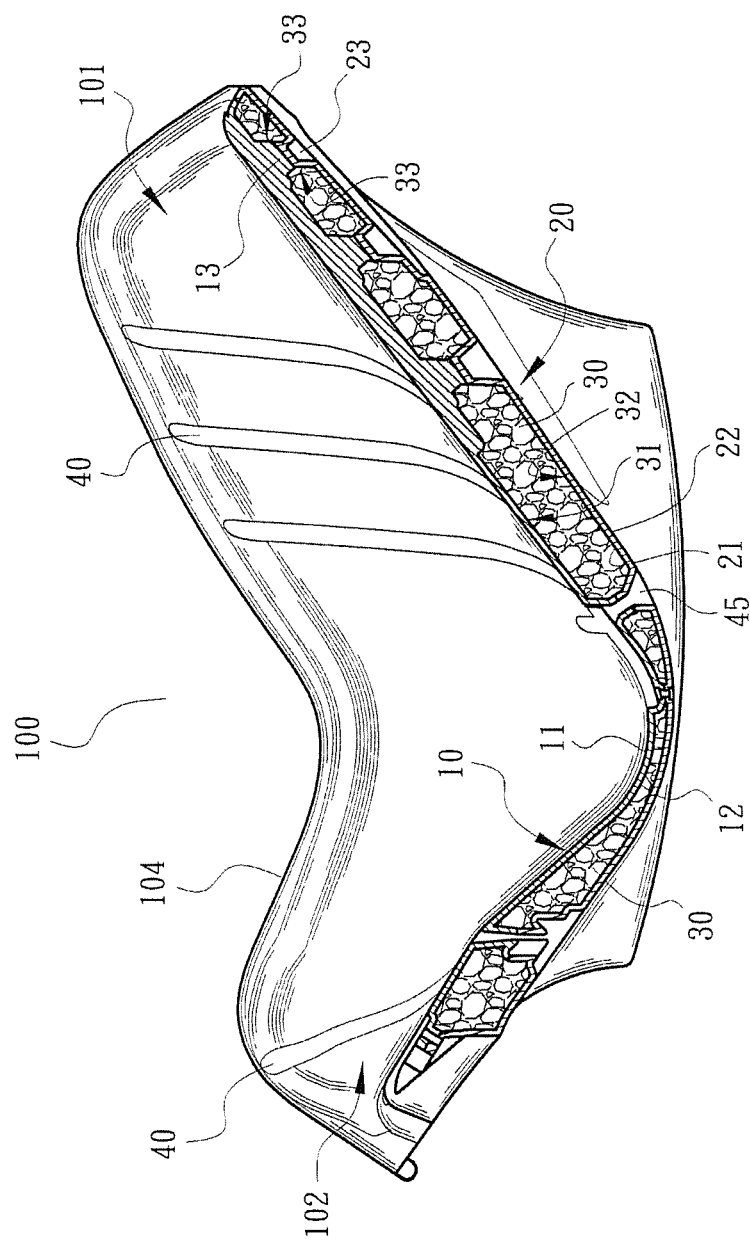
FIG. 3 is a sectional view of the structure of the present invention, showing a combination situation of fixed portions of a first hard layer and interlocking portions of a body.

Referring to FIGS. 1, 2 and 3, a full-cover and light-weight child safety seat 100 of the invention comprises a first hard layer 10, a second hard layer 20, and a body 30 (or a cushion portion) fully covered between the first hard layer 10 and the second hard layer 20. In this adopted embodiment, the first hard layer 10 and the second hard layer 20 are preferably selected of a type of plastic housing, and the body 30 is made of foaming cushion (vibration absorptive) material, e.g., expanded polystyrene (EPS), expandable polystyrene copolymer (EPO), expanded polypropylene (EPP), expandable polyurethane (EPU) or other similar materials, capable of providing cushion effect.

In principle, according to the position of a person to be supported, the safety seat 100 is defined with a back zone 101 and a seat zone 102, and two sides or peripheral zones of the safety seat 100 are respectively formed with a wall 103 and an edge portion 104, so that the person such as a baby or child loaded on the safety seat 100 can be protected by the walls 103. The back zone 101 of the safety seat 100 is provided with through holes 105.

In FIG. 1, an imaginary line represents that a pivotal connection portion 106 disposed on the wall 103 of the safety seat 100 is pivoted to a handle 60, so that a type of free rotation is formed.

In FIG. 2, it is particularly presented that the body 30 is defined with an inner end surface 31 coated with the first hard layer 10 and an outer end surface 32 covered by the second hard layer 20, such that the foaming cushion material (the body 30) is integrally formed with the first hard layer 10 and the second hard layer 20 to form a close-packed composite status, and herewith the improper conditions of the conventional safety seat such as heavier weight and carry inconvenience can be improved.

In the adopted embodiment, the edge portion 104 of the safety seat 100 is constituted by an edge portion 104 of the body 30 connectively covered by an edge portion 104 of the first hard layer 10 and/or an edge portion 104 of the second hard layer 20, and the edge portion 104 of the safety seat 100 can be utilized to fasten the soft cushion by incorporating with an elastic cord.

In the preferred embodiment of FIG. 2, at least one of the first hard layer 10 and/or the body 30 and/or the second hard layer 20 are/is disposed with a guide slot 40, thereby increasing the compressive resistant strength or intensity of load of the safety seat 100 or the body 30. With the first hard layer 10 and/or the body 30 and/or the second hard layer 20 disposed with the guide slot 40, a path of the guide slot 40 is disposed with gas holes 45 to assist in increasing the gas permeability of the baby or child loaded on the safety seat 100.

Actually, the guide slot 40 and the gas holes 45 establish a path and mechanism for guiding or expelling the airflow. That is, when the body 30, the first hard layer 10 and the second hard layer 20 allocated in a module (not shown in Figs.) are heated to perform an integrally-formed process, the foaming cushion (or expansion) material forces the air in the module to move along the guide slot 40 and to be expelled out of the module via the gas holes 45, i.e., the body 30 is directly foamed between the first hard layer 10 and the second hard layer 20 by the foaming material, so that the body 30, the first hard layer 10 and the second hard layer 20 are integrally formed.

Figure 2A:
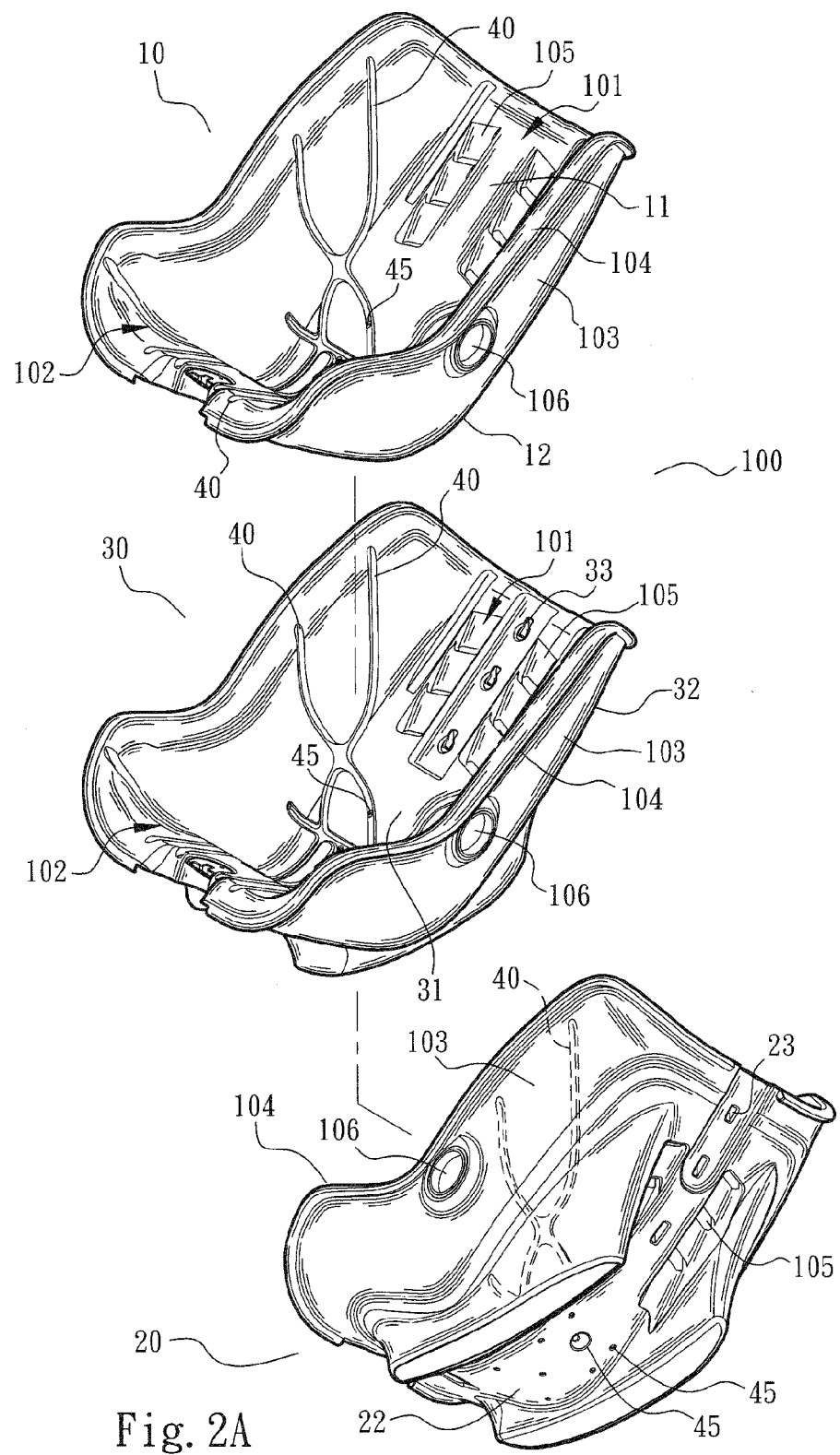
FIG. 2A is schematic exploded view of another structure of the present invention, showing a situation of a first hard layer, a second hard layer and a body.

In the adopted embodiment, the guide slot 40 of the safety seat 100 (or the body 30, or the first hard layer 10, or the second hard layer 20) comprises a plurality of shallow grooves which are partially deployed in parallel and transverse to constitute a combination type of Y and X character shapes and extendedly deployed to the wall 103 (see FIGS. 2, 2A).

In a derivative embodiment, the first hard layer 10 and the second hard layer 20 are integrally formed with the body 30 by adhesion.

In a preferred consideration, the safety seat 100 is defined with a lateral reference axis $\chi$. The lateral reference axis $\chi$ is assumed as a reference datum line, the wall 103 formed on the peripheral zones of the safety seat 100 (or the body 30) has a height at least equal to one-third of a width of the safety seat 100 (or the body 30), thereby utilizing the walls 103 to assist in enclosing the baby or child loaded on the safety seat 100 (or the body 30).

Figure 4:
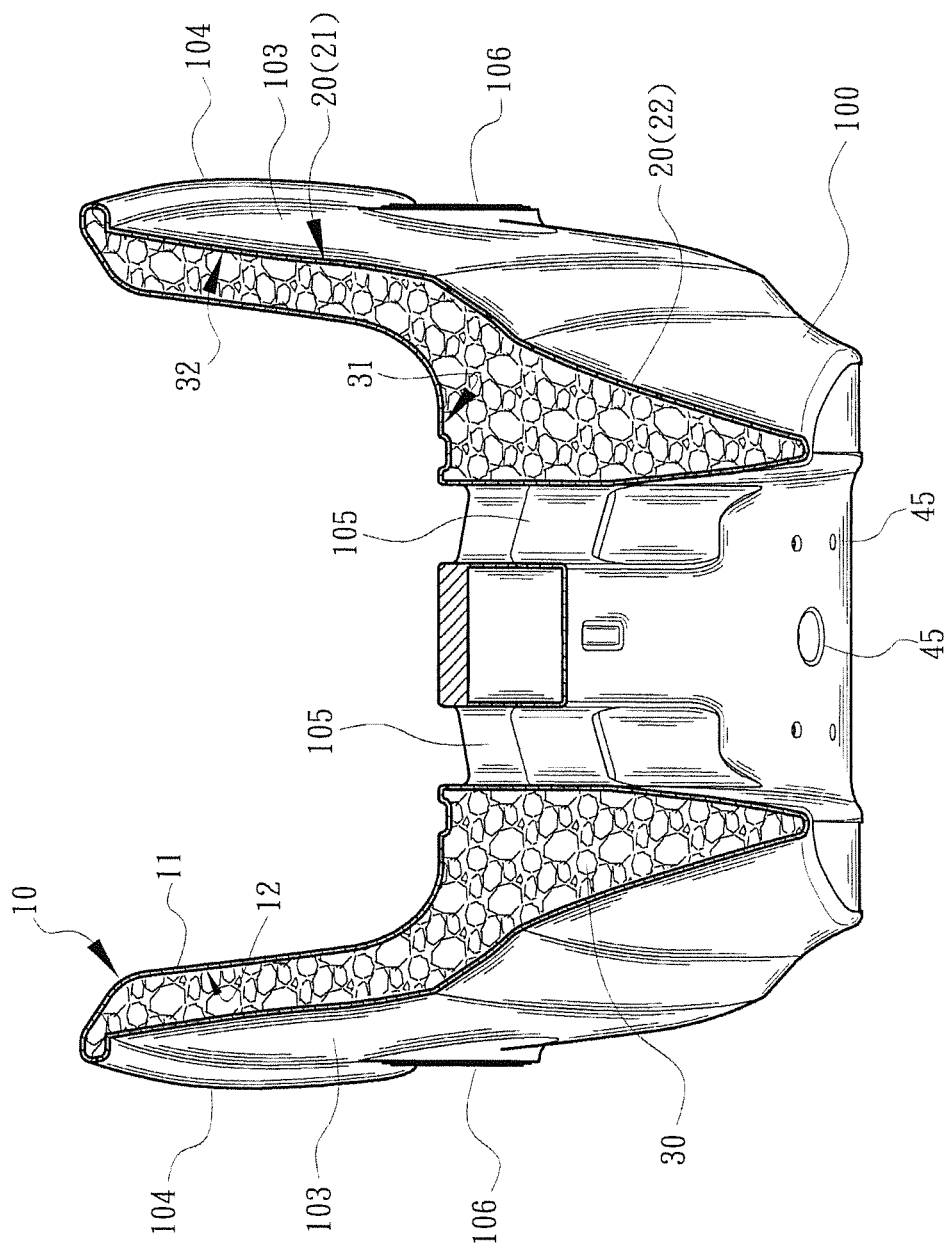
FIG. 4 is a sectional view of another structure of the present invention, illustrating that a body is covered by a first hard layer and a second hard layer.

Referring to FIGS. 2, 3 and 4, the first hard layer 10 is defined with an upper surface 11 and a lower surface 12, and the second hard layer 20 is defined with an upper surface 21 and a lower surface 22. The lower surface 12 of the first hard layer 10 is disposed with a plurality of fixed portions 13, the upper surface 21 of the second hard layer 20 is disposed with a plurality of fixed portions 23, and the body 30 is correspondingly formed with a plurality of interlocking portions 33 relative to the fixed portions 13 and 23. When the first hard layer 10 or the second hard layer 20 is combined or connected to the body 30, the fixed portions 13 and 23 are fixedly assembled to the interlocking portions 33 to assist in fastening the combination of the first hard layer 10 (or the second hard layer 20) and the body 30.

In the adopted embodiment, the fixed portion 13 or 23 is formed as a type of similar convex portion or anchor nail so that the interlocking portion 33 of the body 30 is formed as a type of concave hole, or the interlocking portion 33 of the body 30 is correspondingly formed relative to the fixed portion 13 or 23 when the foaming material is expanded in the module to form the body 30 to enclose the fixed portion 13 or 23 therein. The fixed portions 13 or 23 and the interlocking portions 33 are arranged on the back zone 101 of the safety seat 100, but it is understood that the fixed portions 13 or 23 and the interlocking portions 33 can be arranged on the seat zone 102 or the wall 103 (not shown in FIGs).

In a derivative embodiment, the fixed portion 13 or 23 is formed as a type of similar concave hole, and the interlocking portion 33 of the body 30 is formed as a type of similar convex portion or anchor nail.

The back zone 101 of the safety seat 100 is also disposed with through holes 105 to increase the gas permeability of the person loaded on the safety seat 100. In an applicable embodiment, the through holes 105 of the first hard layer 10 and/or the second hard layer 20 are formed as type of similar post holes capable of enclosing the through holes 105 formed on the body 30, thereby increasing the fixation effect and the stability of the combination of the first hard layer 10, the second hard layer 20 and the body 30.

Figure 5:
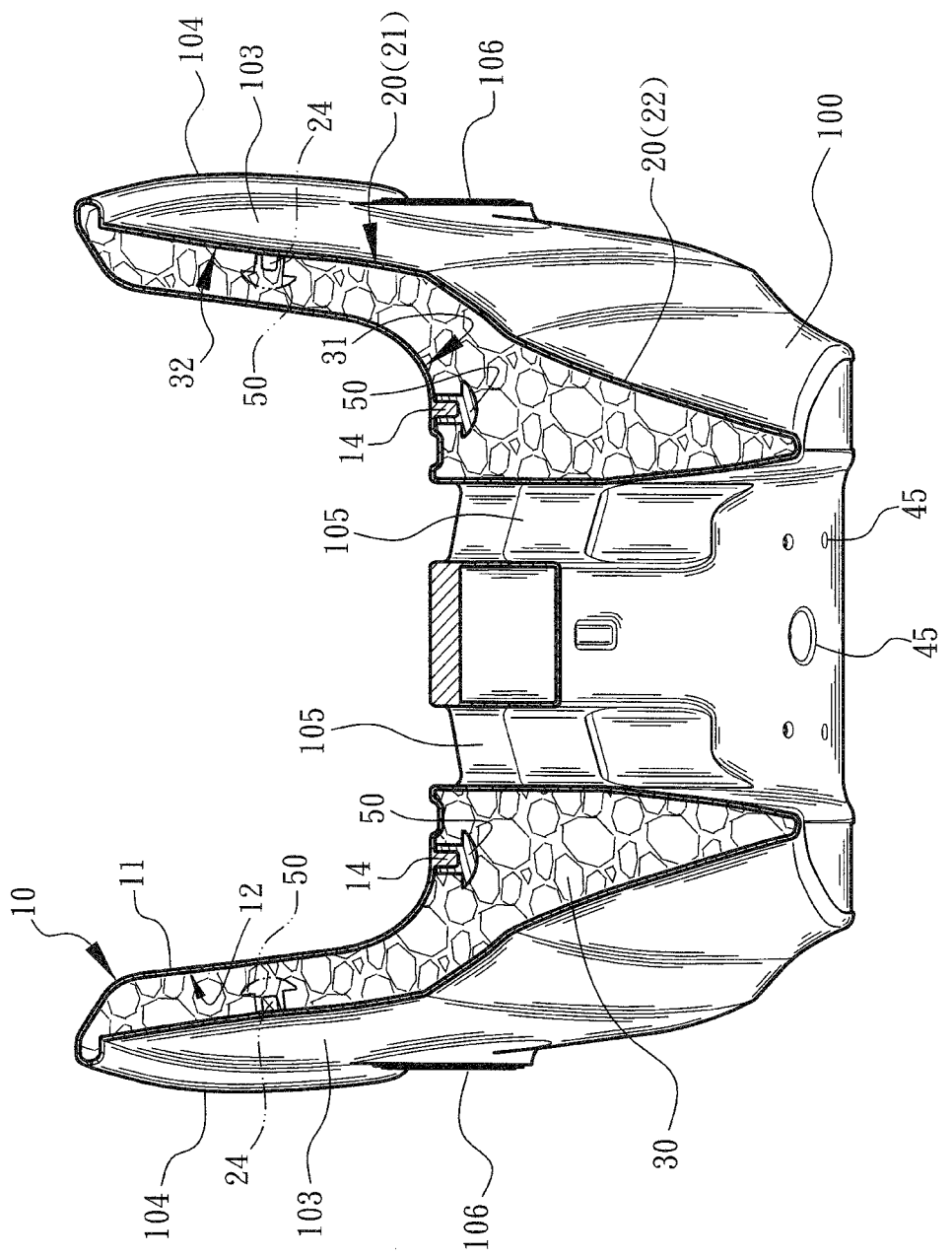
FIG. 5 is a sectional view of still another structure of the present invention, illustrating that a first hard layer assembled with an anchor portion is integrally formed with a body.

Referring to FIG. 5, in a derivative embodiment, the lower surface 12 of the first hard layer 10 or the upper surface 21 of the second hard layer 20 is formed with at least one rib portion 14 or 24 assembled with an anchor portion 50. When the body 30 and the first hard layer 10 (and/or the second hard layer 20) allocated in the module are heated to perform the integrally-formed process, the body 30 and the anchor portion 50 are closely packed in the foaming expansion process of the foaming cushion material to form the body 30, and an excellent combination force is formed between the anchor portion 50 and the first hard layer 10 by an internal pressure naturally generated in the foaming expansion process, so that a more stable combination status of between the body 30 and the first hard layer 10 can be obtained, and also the entire structural strength of the combination structure of the body 30, the first hard layer 10, and the second hard layer 20 can be increased. In the adopted embodiment, the anchor portion 50 is formed as a type of π shape.

Figure 6:
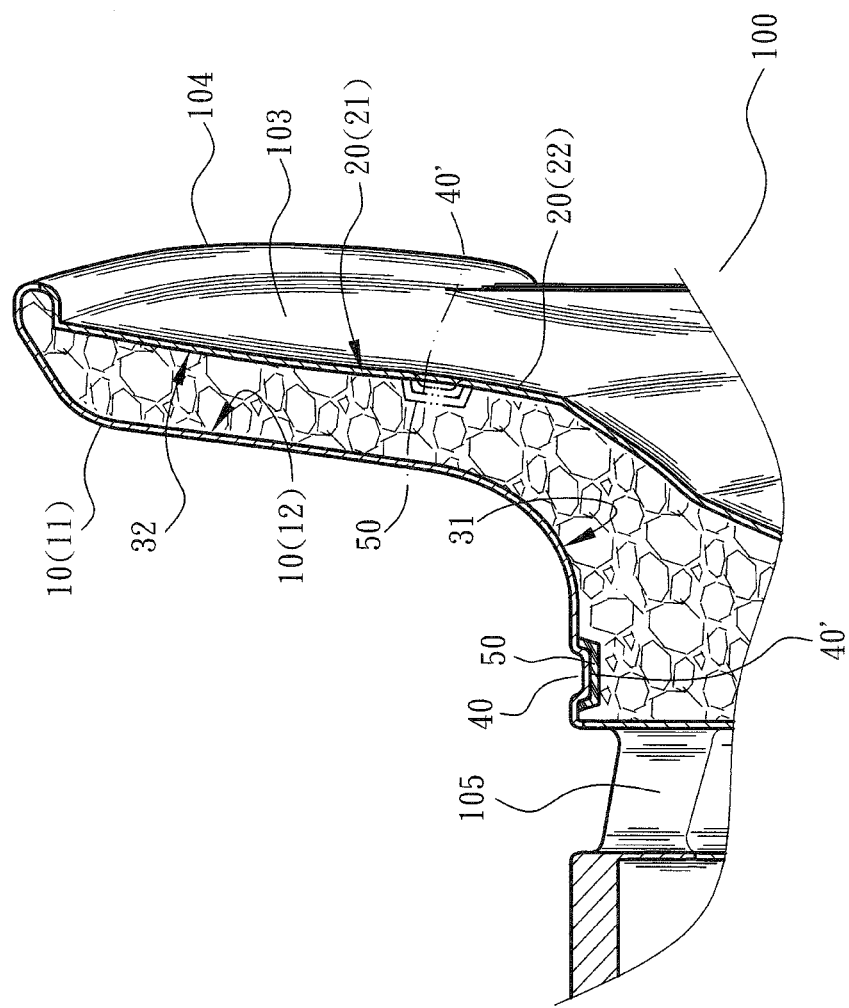
FIG. 6 is a sectional view of yet another structure of the present invention, illustrating that a protruded portion of a first hard layer assembled with an anchor portion is integrally formed with a body.

Referring to FIG. 6, an embodiment providing the guide slot 40 assembled with the anchor portion 50 is illustrated. The guide slot 40 is formed on the upper surface 11 of the first hard layer 10, and a portion corresponding to the guide slot 40 by facing toward the lower surface 12 is formed as a type of similar rib or protruded portion 40', or a portion of the upper surface 21 of the second hard layer 20 corresponding to the guide slot 40 is formed as a type of rib or protruded portion (not shown in FIGs.) Thus, it is applicable that the anchor portion 50 can be assembled to the rib or protruded portion 40'. With the anchor portion 50 to auxiliary anchor the foaming cushion material (or the body 30), a more stable combination status of between the body 30 and the first hard layer 10 (or the second hard layer 20) is obtained, and also the structural strength of the combination structure of the first hard layer 10 (or the second hard layer 20) and the body 30 is enhanced. In the adopted embodiment, the anchor portion 50 is formed as a type of similar U-shape.

When the anchor portion 50 and the rib portion 14 (or the protruded portion 40') are initially assembled, together with the thermal expansion molding of the foaming cushion material, the foaming cushion material generates an expanding and squeezing force (or a pressure) to hold the anchor portion 50 and the rib portion 14 (or the protruded portion 40'), so that a more stable combination status of between the foaming cushion material (or the body 30) and the first hard layer 10 (or the second hard layer 20) is formed, the entire structural strength of the combination structure of the first hard layer 10 (or the second hard layer 20) and the body 30 is enhanced, and it is relatively to possibly reduce the thickness of the body 30 to minimize the entire volume and weight of the safety seat 100. In addition, the structural type or material of the anchor portion 50 can be varied and adjusted to provide different structural strengths in accordance with the different application conditions, thereby providing the safety seat 100 with better flexibility in the manufacturing process.

Representatively speaking, the full-cover and light-weight child safety seat 100 of the present invention provides the following considerations and advantages, compared to conventional skills.

First of all, the redesigned and reconsidered structural configuration and manufacturing types of the safety seat 100 are totally different from that in conventional skills. For example, the safety seat 100 comprises the first hard layer 10, the second hard layer 20, and the body 30 (or a cushion portion) fully covered by or integrally and compositely formed with the first hard layer 10 and the second hard layer 20, wherein the body 30 is made of foaming cushion (vibration absorptive) material.

Further, because the structural type of the body 30 combined with two hard layers (i.e., of the body 30 covered by the first hard layer 10 and the second hard layer 20) is provided with sufficient impact resistant strength (or cushion effect), the safety seat 100 constituted by the foaming cushion material or the body 30 can have a thickness lesser than that in conventional skills, thereby improving the improper conditions in conventional skills, such as carry or deliver inconvenience caused by larger thickness/volume and heavier weight for the purpose of obtaining sufficient strength.

With the structural type of the body 30 covered by the first hard layer 10 and the second hard layer 20 as well as the edge portion 104 of the safety seat 100 utilized to fasten the soft cushion to incorporate with an elastic cord or to directly assemble the related components, the safety seat 100 can have ideal comfortability, and the assembling process of the safety seat 100 can be possibly reduced. The soft cushion is fixed on the safety seat by sewing with plastic hooking pieces in conventional skills can be eliminated.

In comparison with conventional skills, the present invention provides the first hard layer 10 and the second hard layer 20 integrally formed with the body 30 in the module, so that the manufacturing and assembling costs of the safety seat can be possibly reduced. Particularly, when dealing large amount of workpieces of the safety seats, the factors deferring the manufacturing efficiency and quality of the safety seat can be eliminated.

With the structural type of the body 30 covered by the first hard layer 10 and the second hard layer 20, the safety seat 100 or the body 30 constituted by the foaming expansion material can have better protection effect than that in conventional skills, and in particular refer to the service period in that damages or impairs to the body 30 covered by the first hard layer 10 and the second hard layer 20 can be possibly reduced, thereby minimizing the factors affecting the absorption or buffering function of the foaming expansion material.

According to the configuration structure of the body 30 covered by the first hard layer 10 and the second hard layer 20 or integrally formed by foaming, it is understood that the present invention provides an excellent skill to entirely enclose the foaming cushion material, so that lots of seams or gaps presented in the conventional safety seat and dirt accumulation therein can be possibly reduced. Further, with the structural type of the body 30 entirely covered by the first hard layer 10 and the second hard layer 20, it is understood that the washing or cleaning process of the present invention can be facilitated.

In the structural type of the body 30 covered by the first hard layer 10 and the second hard layer 20 of the present invention, the methods such as printing, sticking and coextrusion can be incorporated with various of surface materials (e.g., cloths and rubber leathers) or patterns to enhance level or design effect of the safety seat 100.

If the safety seat 100 is accidentally fallen into water, the water is partially allowed to enter the safety seat 100 through the gas holes 45 thereof to balance the safety seat 100 from being overturned, so that the person to be supported on the safety seat 100 can be protected.

In summary, the full-cover and light-weight child safety seat of the present invention provides ideal structure and configuration, inventive and unique mechanism which are superior to the conventional arts.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A full-cover and light-weight safety seat for a child, defined with a back zone and a seat zone, two sides of the safety seat respectively formed with a wall having a height at least equal to one-third of a width of the safety seat, the safety seat further comprising:
   a first hard layer defined with an upper surface and a lower surface;
   a second hard layer defined with an upper surface and a lower surface;
   a body formed by a foaming material and fully covered between the first hard layer and the second hard layer, defining an inner end surface coated with the first hard layer and an outer end surface covered by the second hard layer, so that the body, the first hard layer and the second hard layer are integrally formed.

2. The full-cover and light-weight safety seat for the child as claimed in claim 1, wherein the safety seat comprises a peripheral zone formed with an edge portion.

3. The full-cover and light-weight safety seat for the child as claimed in claim 2, wherein an edge portion of the body is connectively covered by an edge portion of the first hard layer and an edge portion of the second hard layer to constitute the edge portion of the safety seat.

4. The full-cover and light-weight safety seat for the child as claimed in claim 3, wherein the body is directly foamed between the first hard layer and the second hard layer by the foaming material, so that the body, the first hard layer and the second hard layer are integrally formed.

5. The full-cover and light-weight safety seat for the child as claimed in claim 3, wherein the first hard layer and the second hard layer are integrally formed with the body by adhesion.

6. The full-cover and light-weight safety seat for the child as claimed in claim 3, wherein one of the first hard layer and the second hard layer is formed with at least one rib portion.

7. The full-cover and light-weight safety seat for the child as claimed in claim 1, wherein a guide slot is formed in at least one of the first hard layer, the second hard layer and the body.

8. The full-cover and light-weight safety seat for the child as claimed in claim 7, wherein a path of the guide slot is disposed with at least one gas hole.

9. The full-cover and light-weight safety seat for the child as claimed in claim 7, wherein the guide slot comprises a plurality of shallow grooves partially deployed in parallel and transverse to constitute a combination type of Y or X character shapes and extendedly deployed to the wall.

10. The full-cover and light-weight safety seat for the child as claimed in claim 7, wherein the guide slot is formed on the upper surface of the first hard layer, and the lower surface of the first hard layer is formed as a type of protruded portion corresponding to the guide slot of the first hard layer.

11. The full-cover and light-weight safety seat for the child as claimed in claim 10, wherein the protruded portion is assembled with an anchor portion.

12. The full-cover and light-weight safety seat for the child as claimed in claim 11, wherein the anchor portion is formed as a U-shape.

13. The full-cover and light-weight safety seat for the child as claimed in claim 7, wherein the upper surface of the second hard layer is formed as a protruded portion.

14. The full-cover and light-weight safety seat for the child as claimed in claim 13, wherein the protruded portion is assembled with an anchor portion.

15. The full-cover and light-weight safety seat for the child as claimed in claim 14, wherein the anchor portion is formed as a U-shape.

16. The full-cover and light-weight safety seat for the child as claimed in claim 1, wherein the body is directly foamed between the first hard layer and the second hard layer by the foaming material, so that the body, the first hard layer and the second hard layer are integrally formed.

17. The full-cover and light-weight safety seat for the child as claimed in claim 1, wherein the first hard layer and the second hard layer are integrally formed with the body by adhesion.

18. The full-cover and light-weight safety seat for the child as claimed in claim 1, wherein the safety seat comprises a pivotal connection portion disposed on the wall and pivoted to a handle, so that a type of free rotation is formed.

19. The full-cover and light-weight safety seat for the child as claimed in claim 1, wherein the lower surface of the first hard layer is disposed with a plurality of fixed portions, and the body is formed with a plurality of interlocking portions corresponding to the fixed portions of the first hard layer.

20. The full-cover and light-weight safety seat for the child as claimed in claim 19, wherein each of the fixed portions is formed as a type of convex portion, and each of the interlocking portions is formed as a type of concave hole.

21. The full-cover and light-weight safety seat for the child as claimed in claim 20, wherein each of the fixed portions and each of the interlocking portions are arranged on the back zone of the safety seat.

22. The full-cover and light-weight safety seat for the child as claimed in claim 20, wherein each of the fixed portions and each of the interlocking portions are arranged on the seat zone of the safety seat.

23. The full-cover and light-weight safety seat for the child as claimed in claim 20, wherein each of the fixed portions and each of the interlocking portions are arranged on the wall of the safety seat.

24. The full-cover and light-weight safety seat for the child as claimed in claim 1, wherein the upper surface of the second hard layer is disposed with a plurality of fixed portions, and the body is formed with a plurality of interlocking portions corresponding to the fixed portions of the second hard layer.

25. The full-cover and light-weight safety seat for the child as claimed in claim 24, wherein each of the fixed portions is formed as a type of convex portion, and each of the interlocking portions is formed as a type of concave hole.

26. The full-cover and light-weight safety seat for the child as claimed in claim 1, wherein the back zone of the safety seat is provided with a through hole.

27. The full-cover and light-weight safety seat for the child as claimed in claim 26, wherein the first hard layer and/or the second hard layer, and the body are provided with said through hole formed as a type of post hole.

28. The full-cover and light-weight safety seat for the child as claimed in claim 1, wherein one of the first hard layer and the second hard layer is formed with at least one rib portion.

29. The full-cover and light-weight safety seat for the child as claimed in claim 28, wherein the rib portion is assembled with an anchor portion.

30. The full-cover and light-weight safety seat for the child as claimed in claim 29, wherein the anchor portion is formed as a type of it shape.

\* \* \* \* \*